H. A. ULLRICH & J. TURPIN.
STREET SWEEPER.
APPLICATION FILED APR. 18, 1911.
1,101,045.
Patented June 23, 1914.
2 SHEETS—SHEET 1.
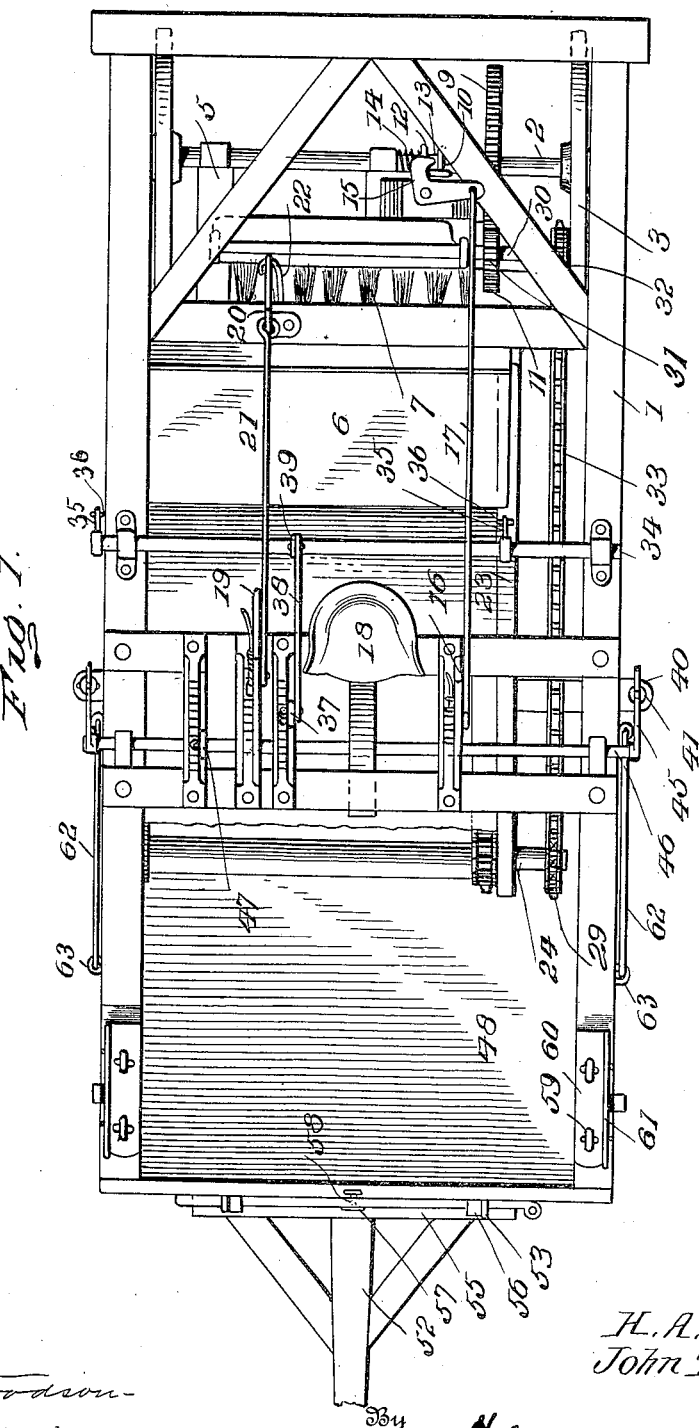
Witnesses
W. N. Woodson
Cora K. Handy.
Inventors
H. A. Ullrich
John Turpin
By
H. A. Stacey, Attorneys H. A. ULLRICH & J. TURPIN.
STREET SWEEPER.
APPLICATION FILED APR. 18, 1911.
1,101,045.
Patented June 23, 1914.
2 SHEETS—SHEET 2.
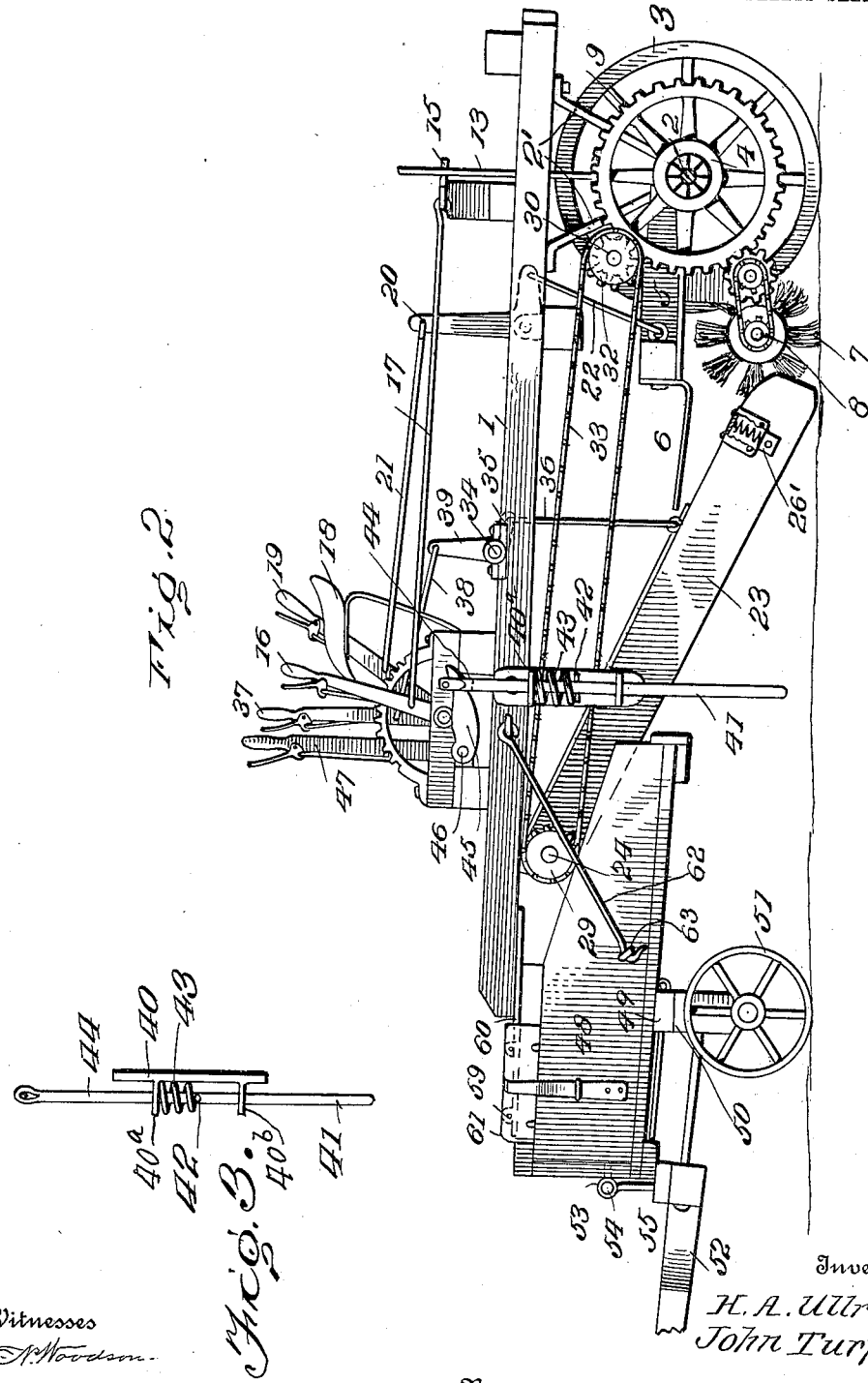
Inventors
H. A. Ullrich
John Turpin
Witnesses
By
Attorneys

UNITED STATES PATENT OFFICE.

HENRY A. ULLRICH AND JOHN TURPIN, OF IRONTON, OHIO.

STREET-SWEEPER.

1,101,045. Specification of Letters Patent. Patented June 23, 1914.

Application filed April 18, 1911. Serial No. 621,841.

*To all whom it may concern:*

Be it known that we, HENRY A. ULLRICH and JOHN TURPIN, citizens of the United States, residing at Ironton, in the county of Lawrence and State of Ohio, have invented certain new and useful Improvements in Street-Sweepers, of which the following is a specification.

This invention has relation to street sweepers, and has for its object to provide a sweeper comprising a primary frame which is supported upon a detachable cart, the cart serving as a receptacle into which the sweepings are deposited. Means is provided upon the main frame for supporting the forward portion thereof when the cart is detached.

Mounted upon the main frame of the sweeper is an elevator trunk, and supported upon the rear axle of the sweeper is a brush frame carrying a revolving brush and parts for operating the same from the rear axle of the main frame. Means are provided upon the main frame for raising and lowering the brush frame, for raising and lowering the rear portion of the elevator trunk, and for throwing the brush shaft in and out of gear with the rear axle of the machine.

For a full understanding of the invention, reference is to be had to the following description and accompanying drawings, in which:

Figure 1 is a top plan view of the sweeper; Fig. 2 is a side elevation of the same; Fig. 3 is a detail elevation of one of the supporting props and its guides.

Corresponding and like parts are referred to in the following description and indicated in all the views of the accompanying drawings by the same reference characters.

The sweeper includes a main frame 1 which is supported at its rear portion upon an axle 2 by means of brackets 2'. Wheels 3 are mounted upon the end portions of the said axle and are provided with clutch devices, indicated at 4, by means of which the axle is caused to rotate with the wheels when the wheels are turning in a forward direction but which permit one or both of the rear wheels to rotate in a rearward direction without rotating the axle. A brush frame 5 is pivotally mounted upon the axle 2 and is provided at its forward portion with a forwardly disposed fender 6. A brush 7 is journaled for rotation upon the brush frame 5 and is provided at one end of its shaft with a sprocket wheel 8. A gear wheel 9 is journaled upon the axle 2 and is provided with a clutch hub 10. A transmission gear, indicated at 11, is arranged to transmit rotary movement from the gear wheel 9 to the wheel 8 and the brush 7. A clutch member 12 is slidably mounted upon the axle 2 but is constrained to rotate with the same. A lever 13 is fulcrumed upon the frame 1 and engages the clutch member 12. A spring 14 is mounted upon the axle 2 and bears at one end against a stop located thereon, and at its other end bears against the clutch member 12. The spring 14 is under tension with a tendency to force the clutch member 12 toward the clutch hub 10 of the gear wheel 9.

A bell crank lever 15 is fulcrumed upon the frame 1 and has one end portion disposed adjacent one edge of the lever 13. A lever 16 is fulcrumed upon the forward portion of the frame 1 and a rod 17 operatively connects the said lever 16 with the bell crank lever 15. Therefore it will be seen that when the lever 16 is swung the rod 17 will be moved longitudinally and the bell crank lever 15 will be turned so that it will swing the lever 13 and the said lever will carry the clutch member 12 away from the clutch hub 10 of the gear wheel 9 and force the same back against the tension of the spring 14. Thus the gear wheel 9 may remain at rest while the axle 2 is rotating.

An operator's seat 18 is mounted upon the forward portion of the frame 1. A lever 19 is fulcrumed upon the frame 1, and a bell crank lever 20 is also fulcrumed upon the said frame. A rod 21 operatively connects the lever 19 with the bell crank lever 20. A rod 22 connects one end of the bell crank lever 20 with the forward portion of the brush frame 5. Therefore it will be seen that by swinging the lever 19, the rod 21 will be moved longitudinally which in turn will rock the lever 20 and cause the rod 22 to move longitudinally, whereby the forward portion of the brush frame 5 may be raised or lowered and the brush 7 carried thereby may be positioned at any desired distance from the surface of the street.

A conveyer trunk 23 is pivotally supported at its forward end upon a shaft 24 which is journaled to the forward portion of the frame 1. The said trunk 23 is in an inclined position under the frame 1 with its receiving end immediately in advance of the brush 7. The brushes 28 at the lower run of the chain belts 25 are adapted to sweep along the upper surface of the bottom of the trunk 23. A wheel 29 is fixed to the end of the shaft 24, and a shaft 30 is journaled upon the brush frame 5. A gear wheel 31 is fixed to the shaft 30 and meshes with the gear wheel 9. A wheel 32 is fixed to the shaft 30 and a chain belt 33 is trained around the wheels 29 and 32 and is adapted to transmit rotary movement from the shaft 30 to the shaft 24. Thus means is provided for operating the chain belts and parts located thereon from the wheel 9.

A shaft 34 is journaled upon the frame 1 and is provided with laterally disposed arms 35. Links 36 are connected at their upper ends with the arms 35 and at their lower ends with the intermediate side portions of the trunk 23. A lever 37 is fulcrumed upon the frame 1 and a rod 38 operatively connects the lever 37 with an upstanding arm 39 mounted upon the shaft 34. Therefore it will be seen that by swinging the lever 37 the rod 38 will be moved longitudinally and through the arm 39 the shaft 34 will be partially rotated and the arms 35 will move the links 36 which in turn will raise or lower the rear portion of the trunk 23.

Plates 40 carrying upper and lower guides 40$^a$ and 40$^b$ are pivotally mounted at their upper ends upon the sides of the frame 1 and props 41 are slidably received in the said guides. The lower ends of the props 41 are normally in the vicinity of the surface of the street. The said props are provided at points between the upper and lower guides with cross pins 42, and coil springs 43 are interposed between the guides 40$^a$ and said cross pins. The said springs are under tension with a tendency to hold the props in elevated position. The props 41 are provided at their upper ends with slots 44 which slidably receive the rear end portions of arms 45. The arms 45 are fixed to a shaft 46 which is journaled upon the frame 1, and an operating handle 47 is fixed to the intermediate portion of the said shaft. Therefore it will be seen that by swinging the handle 47, the shaft 46 will be partially rotated and the arms 45 swinging about the axis of the shaft will force the props 41 in a downward direction so that their lower ends are brought in contact with the surface of the street, and the forward portion of the frame 1 will be supported from the street.

The forward part of the frame 1 is normally supported upon a cart 48 to which it is detachably connected.

The body 48 of the cart is provided at its sides with staples 59 and the side members of the frame 1 are provided at their forward ends with hasps 60 which are adapted to receive said staples. Resiliently supported guide plates 61 are hingedly mounted at the sides of the frame 1 adjacent the staples 59 and serve as means for assisting in directing the hasps 60 in position over the staples 59. Hooks 62 are swingingly mounted at the sides of the body 1 and are adapted to engage eyes 63 carried by the sides of the body 48 of the cart.

When the forward portion of the frame 1 is supported upon the cart 48 and the machine is moved along the street, the brush 7 will engage the material upon the surface of the street and pass the same up into the elevator trunk 23. The brushes operating in the said trunk carry the sweepings up along the bottom of the same and deposit them in the cart 48. When the said cart has become filled with sweepings, the machine is stopped and the operator swings the handle 47 whereby the props 41 are brought in contact with the surface of the street and the forward portion of the frame 1 is slightly elevated with relation to the cut 48 of the cart. Thus the cart is disconnected from the frame 1 and may be driven to a dump, leaving the frame 1 standing in the street.

Having thus described the invention, what is claimed as new is:

1. A machine including a wheeled frame, props slidably mounted at the forward end of the frame, means for forcing the props downwardly into engagement with the ground to support the frame, and means operable upon the release of said first mentioned means for automatically raising the props to inactive position.

2. A machine including a wheeled frame, guides pivotally mounted at the forward portion of the frame, props slidably mounted in said guides, and means for moving the props to elevate the frame and support the same in an elevated position.

3. A machine including a wheeled frame, guides pivotally mounted at the sides of the frame, props reciprocally mounted in the guides, springs engaging the props and guides and adapted to hold the props in an elevated position, a lever mounted upon the frame and operatively engaging the props and adapted when moved in one direction to depress the props whereby they will come in contact with the ground to elevate the forward portion of the frame.

4. A machine including a frame, an axle carried by the rear portion of the frame, supporting wheels carried by said axle, props carried by the forward portion of the frame and adapted for vertical reciprocatory movement with respect to the frame, springs normally holding the props in raised position, and means for forcing the props downwardly against the action of the springs.

In testimony whereof, we affix our signatures in presence of two witnesses.

HENRY A. ULLRICH. [L. S.]
JOHN TURPIN. [L. S.]

Witnesses:
J. C. RILEY,
H. R. SMITH.